(12) United States Patent
Jung et al.

(10) Patent No.: US 10,590,312 B2
(45) Date of Patent: Mar. 17, 2020

(54) COLOR-CHANGING ADHESIVE COMPOSITION

(71) Applicant: 3M INNOVATIVE PROPERTIES COMPANY, Saint Paul, MN (US)

(72) Inventors: Adrian T. Jung, Kaarst (DE); Santhosh K. Chandrabalan, Minneapolis, MN (US); Joanna K. Wegrzynska, Gomunice (PL); Daniel W. Wuerch, Maplewood, MN (US); Christian E. Claus, Düsseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/527,524

(22) PCT Filed: Nov. 16, 2015

(86) PCT No.: PCT/US2015/060856
§ 371 (c)(1),
(2) Date: May 17, 2017

(87) PCT Pub. No.: WO2016/081357
PCT Pub. Date: May 26, 2016

(65) Prior Publication Data
US 2017/0355886 A1 Dec. 14, 2017

Related U.S. Application Data

(60) Provisional application No. 62/081,426, filed on Nov. 18, 2014.

(51) Int. Cl.
| | | |
|---|---|---|
| *C09J 11/06* | (2006.01) | |
| *C09J 163/00* | (2006.01) | |
| *C08G 59/40* | (2006.01) | |
| *C08G 59/42* | (2006.01) | |
| *C08G 59/50* | (2006.01) | |

(52) U.S. Cl.
CPC .......... *C09J 11/06* (2013.01); *C08G 59/4021* (2013.01); *C08G 59/4215* (2013.01); *C08G 59/5013* (2013.01); *C09J 163/00* (2013.01)

(58) Field of Classification Search
None
See application file for complete search history.

(56) References Cited

U.S. PATENT DOCUMENTS

| | | |
|---|---|---|
| 3,551,232 A | 12/1970 | Thompson |
| 3,578,622 A | 5/1971 | Brown |
| 4,160,064 A | 7/1979 | Nodiff |
| 4,164,492 A | 8/1979 | Cooper |
| 4,232,136 A | 11/1980 | Kovacsay |
| 4,332,713 A | 6/1982 | Lehmann |
| 5,539,023 A | 7/1996 | Dreischhoff |
| 6,060,544 A | 5/2000 | Keen |
| 6,331,080 B1 | 12/2001 | Cole |
| 6,444,725 B1 | 9/2002 | Trom |
| 7,279,523 B2 | 10/2007 | Ando et al. |
| 7,705,056 B1 | 4/2010 | Carnahan |
| 8,465,284 B2 | 6/2013 | Craig |
| 2002/0122685 A1 | 9/2002 | Lee |
| 2003/0198914 A1 | 10/2003 | Brennan |
| 2004/0122126 A1 | 6/2004 | Wu |
| 2004/0262336 A1 | 12/2004 | Kwasny |
| 2005/0070627 A1 | 3/2005 | Falsafi |
| 2005/0082338 A1 | 4/2005 | He |
| 2005/0113477 A1 | 5/2005 | Oxman |
| 2013/0096234 A1 | 4/2013 | Jung |
| 2014/0171552 A1 | 6/2014 | Zaffaroni |
| 2014/0264028 A1 | 9/2014 | Hamada |
| 2014/0296402 A1 | 10/2014 | Jung et al. |
| 2014/0302262 A1 | 10/2014 | Miller |

FOREIGN PATENT DOCUMENTS

| | | |
|---|---|---|
| EP | 0342965 | 11/1989 |
| EP | 1566690 | 8/2005 |
| EP | 2562210 | 2/2013 |
| GB | 960276 | 6/1964 |
| WO | WO 1996-00560 | 1/1996 |
| WO | WO 1996-00745 | 1/1996 |
| WO | WO 1996-00899 | 1/1996 |
| WO | WO 1999-40465 | 8/1999 |
| WO | WO 2000-22060 | 4/2000 |
| WO | WO 2002-30363 | 4/2002 |
| WO | WO 2004-069886 | 8/2004 |
| WO | WO 2006-014597 | 2/2006 |
| WO | WO 2008-076739 | 6/2008 |
| WO | WO 2012-003204 | 1/2012 |
| WO | WO 2013-062993 | 5/2013 |
| WO | WO 2014-015170 | 1/2014 |
| WO | WO 2015-102966 | 7/2015 |

OTHER PUBLICATIONS

Eldem, "Electrophilic reactivity of cationic triarylmethane dyes towards proteins and protein-related nucleophiles", Dyes and Pigments, 2004, vol. 60, pp. 49-54.
International Search report for PCT International Application No. PCT/US2015/060856 dated Jan. 28, 2016, 3 pages.
European Search Report (Application No. 15860990.9-1107) dated Apr. 6, 2018.
Search Report for CN Appl. No. 201580063343.5, dated Sep. 24, 2019, 2 pages.

*Primary Examiner* — Ana L. Woodward
(74) *Attorney, Agent, or Firm* — Janet Kling

(57) ABSTRACT

The present disclosure relates to a color-changing adhesive composition, for example, a color-changing adhesive composition suitable in the preparation of composite materials. The present disclosure also relates to methods of preparing composite materials using color-changing adhesive compositions and to composite-materials comprising such color-changing compositions.

13 Claims, No Drawings

COLOR-CHANGING ADHESIVE COMPOSITION

CROSS REFERENCE TO RELATED APPLICATIONS

This application is a national stage filing under 35 U.S.C. 371 of International Application No. PCT/US2015/060856, filed Nov. 16, 2015, which claims the benefit of U.S. Provisional Patent Application No. 62/081,426, filed Nov. 18, 2014. The disclosures of both applications are incorporated by reference in their entirety herein.

The present disclosure relates to a color-changing adhesive composition, for example, a color-changing adhesive composition suitable in the preparation of composite materials. The present disclosure also relates to a method of preparing composite materials using color-changing adhesive compositions and to composite-materials comprising color-changing compositions.

BACKGROUND

In certain applications for adhesive compositions it is desirable to control the amount of adhesive used or to indicate the areas where the adhesive has been applied. This is the case for certain spray adhesives. Therefore, some spray adhesive compositions are colored as described, for example, in US patent application publication No. 2005/0082338. An example of an application where it may be desirable to indicate the areas where the adhesive composition has been applied to is the preparation of composite materials. Certain composite materials, for example those containing one or more curable resins and reinforcing materials like fibers, are widely used as a light weight alternative to metals, for example in the production of components for use in the automotive, aircraft, and watercraft industries, as well as in the architecture and construction businesses. A typical process for making composite materials involves the preparation of a layer containing the reinforcing materials, such as fibers. The reinforcing materials in those applications are held in place by means of adhesives. The adhesives are typically sprayed onto the substrate and are colored to indicate the areas onto which the adhesives have been applied and to avoid using excessive amounts of adhesives. A resin material is then typically combined with the reinforcing material and subjected to curing. This process may be repeated as needed, depending on the application. When using colored adhesives, colored residue of the adhesive may remain visible in the finished composite material. This residual color can be undesirable because it could negatively impact the visual appearance of the finished composite material. Certain embodiments of this disclosure provide an adhesive composition that has an initial color to facilitate the application of the adhesive composition to a substrate, which color changes at a later stage to minimize the color impact on the final material.

SUMMARY

In certain embodiments, the present disclosure provides color-changing adhesive compositions having an initial color, where the adhesive composition is capable of changing color to a final color, different from the initial color, once the adhesive compositions contact a curing composition comprising one or more curing agents. In certain embodiments, the final color is colorless. In other embodiments, the present disclosure provides methods of preparing a composite material containing at least one a substrate, such as a reinforcing material, and at least one resin that is at least partially cured, said process comprising applying an adhesive composition to the substrate and contacting the substrate with a mixture of a curable resin and a curing composition which comprises one or more curing agents, to provide a composite material, wherein the initial color of the adhesive composition changes to a final color when the adhesive composition contacts the curing composition.

In another aspect, the present disclosure provides an article containing a composite material comprising color-changing adhesive compositions.

In a further aspect, the present disclosure provides an adhesive composition comprising at least 10% by weight of an organic solvent and a dye selected from phenothiazine-based dyes and triarylmethane-based dyes.

In yet another aspect, the present disclosure provides a two component composition comprising:

A component A comprising an adhesive composition according to any of the preceding claims and optionally at least 10% by weight of a propellant;

A component B comprising: (i) one of a curable composition chosen from a curable epoxy composition and a curable polyester composition and (ii) a curing composition comprising one or more curing agents chosen from: a) amine-based compounds, cyanamide-based compounds, mercapto-based compounds, and anhydride-based compounds if the curable composition is a curable epoxy composition or b) peroxide-based compounds if the curable composition is a curable polyester composition.

In yet another aspect, the present disclosure provides a three component composition comprising:

A component A comprising an adhesive composition according to any of the preceding claims and optionally at least 10% by weight of a propellant;

A component B comprising one of a curable composition chosen from a curable epoxy composition and a curable polyester composition; and A component C comprising a curing composition comprising one or more curing agents chosen from: a) amine-based compounds, cyanamide-based compounds, mercapto-based compounds, and anhydride-based compounds if the curable composition is a curable epoxy composition or b) peroxide-based compounds if the curable composition is a curable polyester composition.

All scientific and technical terms used herein have meanings commonly used in the art unless otherwise specified. The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "containing", "comprising," or "having" is meant to encompass the items listed thereafter and equivalents thereof as well as additional items. The use of "consisting" is meant to be limiting and to encompass the items listed thereafter and equivalents thereof but no additional items.

The term "sprayable adhesive" as used herein refers to an adhesive that can be delivered in the form or a spray or aerosol. A sprayable adhesive may contain suitable propellants, but the presence of a propellant is not necessary for an adhesive to be considered a sprayable adhesive.

The term "sprayable composition" as used herein refers to a liquid composition that can be delivered in the form or a spray or aerosol. A sprayable composition may contain suitable propellants, but the presence of a propellant is not necessary for a composition to be considered a sprayable composition.

The term "curable resin" as used herein refers to polymeric resin that is in a pre-curing state and that is capable of being cured upon being contacted with one or more curing agents. Curing can occur, for example, by heat, radiation (such as electron beam or UV radiation), chemical additives, or combinations thereof. A mixture of a curable resin and a curing composition has the necessary components to cure the curable resin and may contain partially cured resin, but in the early stages of the curing process the mixture can still be manipulated before full curing occurs, for example to infuse a fiber-based reinforcing material.

The term "an adhesive composition capable of changing color" as used herein refers to the capability of the dye that was originally part of the adhesive composition to change color upon contact with a curing composition. The change is at least in the hue attribute of color (see below for a discussion of color attributes) and, when measured using the CIELAB color space according to ASTM E308 (for Delta E) the Delta E is greater than 2.

DETAILED DESCRIPTION

In certain embodiments, the present disclosure is directed to an adhesive composition comprising a dye,
a sprayable adhesive, and
optionally a curable resin;

In some embodiments, the optional curable resin is a polyester resin or an epoxy resin. In certain embodiments, the adhesive composition of this disclosure may be used to temporarily hold in place materials that may later be subject to a more permanent or stronger bond by the use of a cured or partially-cured resin. For example, in the manufacture of certain composites in the wind-blade or marine industries, glass fibers or other reinforcing materials are held in place by a sprayable adhesive before the fibers or reinforcing materials are infused with a curable resin. The two most commonly used polymeric curable resins in the manufacture of wind-blade products are epoxy resins and polyester resins. When the adhesive of the present disclosure is intended to be used with epoxy resins, the dye present in the adhesive is chosen from triarylmethane compounds. In contrast, if the adhesive of the present disclosure is intended to be used with polyester resins, the dye present in the adhesive is chosen from phenothiazine compounds.

Because of the dye, the adhesive composition has an initial color. However, the adhesive composition is capable of changing color to a final color (which is different from the initial color) upon contacting a curing composition comprising one or more curing agents. The one or more curing agents are suitable to cure either the curable epoxy resin or the curable epoxy resin, as the case may be.

Thus, in some embodiments, the adhesive composition comprises: a dye, a sprayable adhesive, and optionally a curable epoxy resin;

wherein the dye is chosen from triarylmethane compounds;

wherein the adhesive composition is sprayable and has an initial color;

wherein the adhesive composition is capable of changing color to a final color upon contacting a curing composition comprising one or more curing agents; wherein the one or more curing agents are suitable to cure the curable epoxy resin; and wherein the initial color is different from the final color.

In other embodiments, the adhesive composition comprises a dye, a sprayable adhesive, and optionally a curable polyester resin;

wherein the dye is chosen from phenothiazine compounds;

wherein the adhesive composition is sprayable and has an initial color;

wherein the adhesive composition is capable of changing color to a final color upon contacting a curing composition comprising one or more curing agents; wherein the one or more curing agents are suitable to cure the curable polyester resin;

wherein the initial color is different from the final color.

Adhesives

In some embodiments, the adhesive compositions contain one or more adhesives. Typical adhesives that may be used include but are not limited to acrylate-based adhesives, rubber-based adhesives, epoxy-based adhesives, styrene-butadiene adhesives and the like. The adhesives may be block copolymers. Block copolymers are elastomeric materials in which chemically different blocks or sequences are covalently bonded to each other. Block copolymers include at least two different polymeric blocks that are referred to as the A block and B block. The A block and B block may have different chemical compositions and different glass transition temperatures. The block copolymer may comprise aliphatic vinyl group monomers having carboxyl groups such as (meth)acrylic acid, crotonic acid, maleic acid, maleic acid anhydride, fumaric acid, or (meth)acrylamide; aromatic vinyl group monomers such as, e.g. styrene, alpha-methyl styrene, or p-methyl styrene; conjugated diene group monomers such as but not limited to butadiene or isoprene; olefin group monomers such as e.g. ethylene or propylene or lactone group monomers. Examples include but are not limited to styrene-butadiene polymers, for example those commercially as SBR1009AF a styrene-butadiene copolymer cross-linked with divinyl benzene available from Ashland. Examples of acrylate-based adhesives include those as described in U.S. Pat. No. 3,578,622, which is incorporated by reference herein for its disclosure of acrylate-based adhesives. Examples of epoxy-based adhesives include those described in US patent application NO. 2005/0082338, which is incorporated by reference herein for its disclosure of epoxy-based adhesives.

In some embodiments, the adhesives are pressure-sensitive adhesives, which means they are instantaneously adhesive upon application. Usually, mild pressure is applied to adhere the substrate, for example finger-tip pressure. The adhesive may also be hot-melt adhesives, which means the adhesives are activated by a heat treatment to become adhesive. In certain embodiments, the sprayable adhesive is 3M's super 77, low VOC elastomer adhesive.

Solvents

In some embodiments, the adhesive compositions may be solids but preferably the adhesive compositions comprise one or more organic solvents. In some embodiments, the adhesives are solvent-based and contain organic solvents. Organic solvents include non-polar and polar solvents. Organic solvents include, for example, liquid hydrocarbons, liquid hydrocarbons that further contain units selected from ketone units, ether units, carboxylate ester units and combinations thereof. The hydrocarbons are typically saturated. The solvents typically have a melting point below 20° C. and a boiling point greater than 30° C. and preferably less than 200° C. or less than 100° C. or even less than 70° C. Examples of solvents include but are not limited to methyl ether ketone, acetone, xylene, hexane, diethyl ether, butyl ethyl ether. In certain embodiments, the solvent-based adhesives may contain solvents at a significant amount. For example, some embodiments may contain at least about 10% by weight of an organic solvent, based on the total weight of the adhesive. In some embodiments, the adhesive composition comprises from 12 to 40% by weight of solvents or from 20 to 50% by weight (weight percents, based on the total weight of the adhesive composition). In one embodiment, the adhesive compositions may be aqueous.

Propellants

In a more preferred embodiments the adhesive compositions are sprayable-adhesives. This means the adhesive compositions are sprayable. In some embodiments, sprayable adhesives are typically contained in a container kept under pressure that is greater than ambient pressure. The container contains a release valve or actuator which allows the adhesive composition to be released, for example as spray or aerosols. Typically, the spray adhesive is released as spray through the release valve or actuator which may contain a nozzle to produce a spray or aerosol. Container vessels, such as e.g. cylinders, may have a hose attached between the valves and the actuator.

In certain embodiments, the spray adhesives contain one or more propellant. Propellants as referred to herein include liquefied hydrocarbons and compressed gasses. Liquefied hydrocarbons are hydrocarbons that are gaseous at ambient conditions (20° C., 1 bar) but are kept under pressure to be in liquid form at ambient temperature. Liquefied hydrocarbons may be unsaturated or saturated. They may be linear, branched or cyclic. Typically there are aliphatic. Examples include but are not limited to butane, propane, isopropane, isobutene and the like. The hydrocarbons may be halogenated, but preferably are not halogenated.

In some embodiments the spray adhesive may contain, in addition to the liquefied hydrocarbons or as alternative, compressed gases. Such gases are gaseous at ambient conditions but are kept under increased pressure (i.e. they are compressed). They may still be in a gaseous state but they may also be liquefied. The compressed gases may be organic (for example hydrocarbons or halogenated hydrocarbons) or may be inorganic. Exemplary inorganic compressed gases include: carbon dioxide, nitrogen, nitrous dioxide, compressed air or combinations thereof.

In one embodiment the adhesive compositions may contain from about 10 to about 75% by weight of propellants based on the weight of the adhesive compositions. This may be a combined weight of propellants and solvents. In some embodiments, the propellant may act as a solvent for one or more components of the adhesive composition.

Colorants

The adhesive compositions provided herein are colored. They contain at least one colorant. The colorants may be dyes or pigments and may be present in dissolved or dispersed form, preferably in a dissolved form. Suitable colorants are reactive to (i.e., change color from an initial color to a final color upon contact with) the curing system used to cure the curable resin materials by undergoing a change in color, referred to herein as "color changing". In certain embodiments, the colorants change color from an initial color to a colorless state. The color change may occur concurrently with the curing reaction. Preferably the color change has happened when the curing reaction has been completed. The colorant may react to the curing system used, for example a curing agent or a curing catalyst or both, or to side products or intermediates generated in the curing reaction or to the curable resin.

The colorants are selected according to the curing reaction and curing systems they are intended to react to. They are used in amounts to color the adhesive composition but undergo a visible change in color upon reaction with the curing system. Typical amounts in certain embodiments may include from 0.05% to 30% by weight based in the total weight of the adhesive composition. In other embodiments, the amount of colorant is from 0.05% to 20% by weight based on the total weight of the adhesive composition. Yet in other embodiments, the amount of colorant is from 0.1% to 10% by weight based on the total weight of the adhesive composition.

In certain embodiments, the color change is visible to the naked eye. Examples of color changes include, but are not limited to, changes from green to colorless, red to colorless, yellow to colorless, orange to colorless, or blue to colorless. In case the resin is colored or non-transparent, the color-change may be that the colored adhesive composition is no longer discernable to the naked eye over the color of the resin after curing is complete.

The color change disclosed herein is directed to a visible color change of the components. Color is made up of three separate attributes: hue, chroma, and lightness. Hue is the perceived object color, e.g., red, yellow, blue, green, etc. Chroma (or saturation) is the vividness of a color, e.g., dull (or grey) to vivid (or saturated). Lightness (or value) is the degree of lightness of a color, e.g., white to dark. A color change as referred to herein, is a change in color visible to the naked eye. More preferably, the change in color is related to a change in hue (red to green, blue to yellow, etc.). Although these color changes can be, and are preferably, observed visually with the naked eye, an instrument may be used to more accurately determine the change in color. The color change may be quantitated using CIELAB or CIELCH color spaces. In CIELAB color space L* defines the lightness, a* defines red/green, and b* defines blue/yellow. In some embodiments, the color change observed in L*a*b* color space means Delta E is greater than 1, 2, 3, 5, 6, 8, 10, 20, 30 or even 40, where Delta E* is equal to the square root of the sum of the change in L* squared plus the change in a* squared plus the change in b* squared. In CIELCH color space L* defines the lightness, C* defines chroma, and h is the hue angle. In certain embodiments, a color change in L*C*h color space means Delta H is greater than 1, 2, 3, 5, 6, 8, 10, 20, 30, 40, or even 50, where Delta H is equal to the square root of the difference of the change in E* squared minus the sum of the change in L* squared and the change in C squared.

Preferred colorants are organic dyes, more preferably organic aromatic dyes and most preferably organic dyes selected from dyes based on triaryl methane dyes and phenothiazine-based dyes.

a) phenothiazine

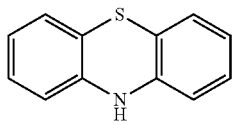

b) triphenyl methane (a triaryl methane)

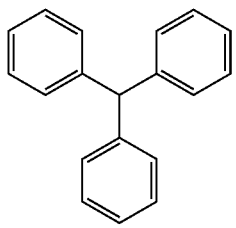

Non-limiting examples of suitable commercial dyes include Methylene Blue, (a phenothiazine-based dye), and Brilliant Green, (a triphenylmethane-based dye) (see structures below).

Examples of Commercial Dyes a): Methylene Blue (as chloride salt)

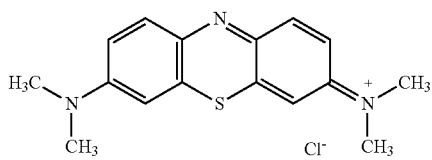

b): Brillant Green (hydrogen sulfate salt)

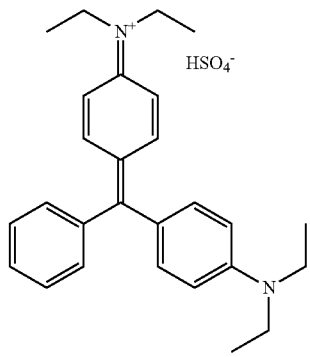

In one embodiment of the present disclosure the colorants are selected from triarylmethane dyes having the following general formula:

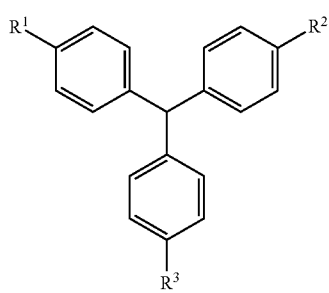

Various values of R1, R2, and R3 are defined below for specific members of the triarylmethane group of compounds.

Triaryl methane dyes can be grouped into families according to the nature of the substituents on the aryl groups. The dyes are cationic and may be shown below as chloride salts but they may also contain other different anions.

Methyl violet dyes have dimethylamino groups at the p-positions of two aryl groups and include but are not limited to:

Methyl violet 2B:

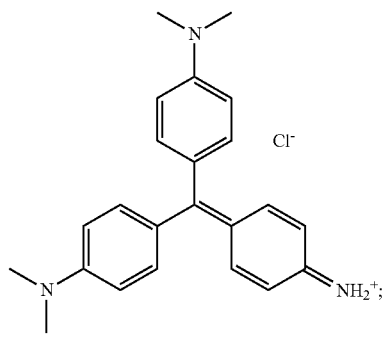

-continued

Methyl violet 6B:

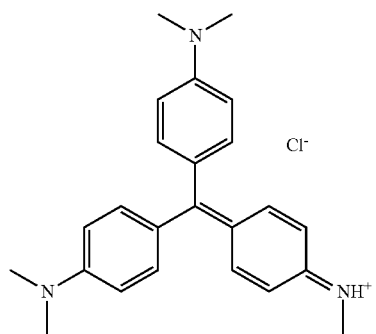

Methyl violet 10B:

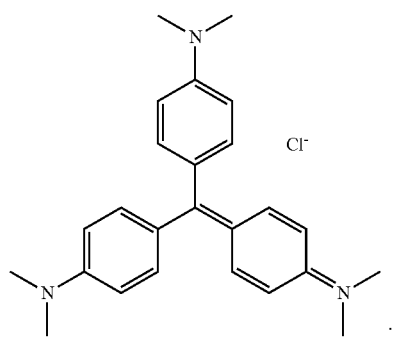

Fuchsine dyes have amine (NH$_2$ or NHMe) functional groups at the p-positions of each aryl group. Fuchsine dyes include but are not limited to:

Pararosaniline:

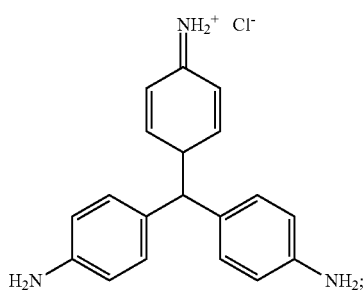

Fuchsine (hydrochloride salt):

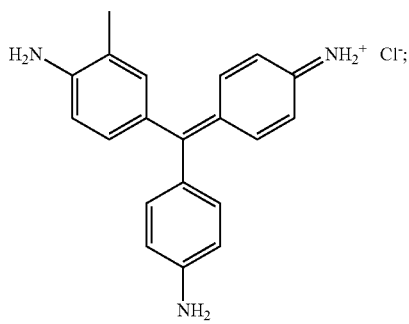

-continued

New fuchsine (cation):

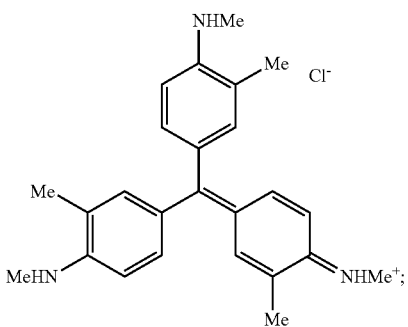

Fuchsine acid

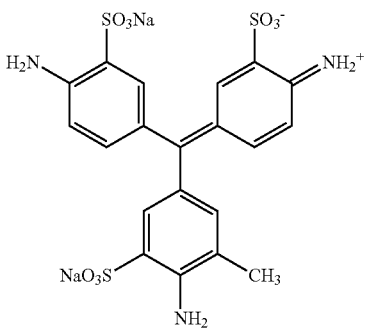

Phenol dyes have hydroxyl groups at the p positions of each aryl group and include but are not limited to:

Chlorophenol red:

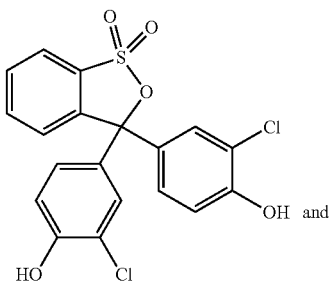 and

Cresol red:

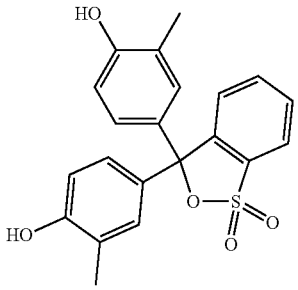

Malachite green compounds contain one unsubstituted phenyl ($C_6H_5$) group and include Malachite green or Brilliant Green:

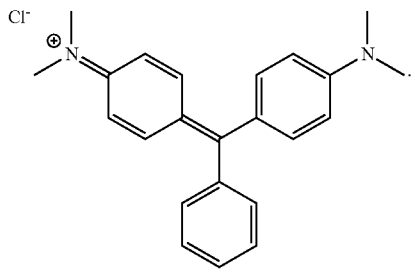

Where two of the aryl groups are bridged by a heteroatom, these triarylmethane compounds may be further categorized into acridines (nitrogen-bridged), xanthenes (oxygen-bridged), and thioxanthenes (sulfur-bridged).

In certain embodiments, when the curable resin comprises a curable epoxy resin, the dye is chosen from Brilliant Green, Malachit Green, Crystal Violet, Phenolphthalein, and mixtures thereof.

In certain embodiments, when the curable resin comprises a curable polyester resin, the dye is chosen from methylene blue, new methylene blue, methylene green, azure A, tolonium chloride, and mixtures thereof.

The colorant in the adhesive compositions changes from an initial color to a final color upon contact with the curing composition used to cure the resin. The color-change may, for example, be in response to radicals, for example, radicals generated by the curing agent or radicals generated in the curing reaction. In certain embodiments, the color-change may also be take place in response to a temperature increase, for example if the curing reaction is exothermic and the energy released by the curing reaction leads to the color-changing response of the colorant. The color-change may, for example, also be a response to a combination of the above.

In some embodiments, the colorants are reactive to (i.e., change color upon contacting) the curing composition used to cure the curable resins comprising curable epoxy resins, curable polyester resins, curable polyurethans, curable vinyl resins or combinations thereof. In other embodiments, the colorants are reactive to the curing reaction or curing agents of curable resins comprising curable epoxy resins or polyester resins.

In certain embodiments involving polyester resins, the colorants are reactive to radical-generating curing compositions, for example to curing reaction initiated and/or carried by radical generating compounds (hereinafter "radical curing agents"), such as but not limited to peroxides. The peroxides may be organic or inorganic. In another embodiment, the colorants are reactive to curing compositions comprising one or more amine-based curing agents. In yet another embodiment the colorants are reactive to a curing reaction involving an amido-based curing agent, for example a cyanamide. In other embodiments, the colorants are reactive to curing compositions comprising one or more anhydride-based curing agents. In yet other embodiments, the colorants are reactive to curing compositions comprising one or more mercapto-based curing agents. Examples of typical mercapto-based curing agents include, but are not limited to, the following commercially-known compounds: Capcure 3-800, Capcure 3830-81, Capcure LOF, Capcure WR6, Capcure WR35, Capcure 40 SEC HV (Cognis), GPM 800, GPM 800 LO, GPM 830 CB, GPM 845 MT, GPM 888, GPM 890 CB, GPM 891, GPM 895 FC (Gabriel Performance Products), Karenz MT [pentaerythritol tetrakis(3-mercaptobutylate); CAS 31775-89-0] (Showa Denko), dipentenedimercaptan (CAS 4802-20-4), Mercaptized Soy Oil, PM 407, PM 358, Mercaptized Castor Oil: 805-C (Chevron Phillips), Thiocure® GDMA (glycol dimercaptoacetate; CAS 123-81-9), Thiocure® TMPMA (trimethylpropane trimercaptoacetate; CAS 10193-96-1), Thiocure® PETMA (pentaerythritol tetramercaptoacetate; CAS 10193-994), Thiocure® TMPMP (trimethylopropane tris-3-mercaptopropionate; CAS 33007-83-9), Thiocure® PETMP (pentaerythritol tetra-3-mercaptopropionate; CAS 7575-23-7), Thiocure® ETTMP (ethoxylated trimethylpropane tris-3-mercaptopropionate (polymer), CAS 345352-19-4) (Bruno Bock).

Adjuvants

The adhesive compositions may include additional ingredients to further improve or optimize the properties of the adhesive composition including but not limited to shelf-life, visual appearance, open pot time and handling of the adhesive compositions. In certain embodiments, To improve adhesiveness, the adhesive composition may contain one or more tackifiers. Tackifiers known in the art may be used. Examples of suitable tackifiers include but are not limited to rosin resins, e.g. rosin esters and their derivatives, polyterpenes and aromatic-modified polyterpene resins, coumarone-indene resins, alpha pinene-based resin, beta pinene-based resin, limonene-based resin. Partially or completely hydrogenated tackifiers may also be used.

Other optional additives include for example surfactants, stabilizers, corrosion inhibitors, or combinations thereof.

In some embodiments stabilizers are anti-oxidants. Examples of anti-oxidants include phenols, phosphites, thioesters, amines, polymeric hindered phenols, copolymers of 4-ethyl phenols, phenolic-based anti-oxidants or combinations thereof. Corrosion inhibitors are chemical compounds that can intervene in the chemical reactions of the composition with its metal surroundings, e.g. a storage drum or a containment vessel. Corrosion inhibitors include for example sulfonates, morpholine, benzotriazole, various amines, sodium benzoate, sodium nitrate, formamide or combination thereof or others well known in the art.

Curable Resins and Curing Compositions

Curable resins include, but are not limited to polyester resins, epoxy resins, polyurethane resins, vinyl resins, and combinations thereof. Certain embodiments disclosed herein refer to systems comprising a polyester curable resin or comprising an epoxy curable resin. Some embodiments may refer to components (e.g., dyes, curing agents, etc) that are used preferentially with, for example, a curable polyester resin system, while other components may be referred herein as being used preferentially with, for example, a curable epoxy resin system. However, in the absence of a specific reference to a particular curable resin system, all other embodiments disclosed in throughout the entire application are intended to apply to a system comprising any curable resin, be it a polyester resin, epoxy resin, polyurethane resin, vinyl resin, and combinations thereof.

In one embodiment the curable resins comprise polyester resins. Polyester resins are unsaturated resins formed by the reaction of dibasic organic acids and polyhydric alcohols. Unsaturated polyesters are condensation polymers formed by the reaction of polyols (also known as polyhydric alcohols), organic compounds with multiple alcohol or hydroxy functional groups, with saturated or unsaturated dibasic acids. Typical polyols used are glycols such as ethylene glycol; acids used are phthalic acid and maleic acid. The use of unsaturated polyesters and additives such as styrene lowers the viscosity of the resin. The initially liquid resin is converted to a solid by cross-linking chains. This is done by creating free radicals at unsaturated bonds, which propagate in a chain reaction to other unsaturated bonds in adjacent molecules, linking them in the process. Thus, in certain embodiments where the curable resin comprises a polyester resin, the curing agents are chosen from radical generating compounds. In some embodiments, the curing agents are chosen from peroxide-based compounds. The initial free radicals are induced by adding a compound that easily decomposes into free radicals. Radical generating compounds include peroxides, which may be organic or inorganic and preferably are inorganic. Examples of inorganic peroxides include but are not limited to benzoyl peroxides or methyl ethyl ketone peroxides. In certain embodiments, the curing agent is dibenzoyl peroxide or a suitable derivative thereof. In some embodiments, the polyester resin is chosen from PLUS 720 from Novol Sp. Z.o.o., Poland.

In one embodiment the colorants according to the present disclosure are reactive to a curing reaction involving a curable polyester resin and a radical curing agent.

In another embodiment the curable resin comprises a curable epoxy resin. Useful curable epoxy resins include those derived from epoxy-functionalized monomers such as monomers containing one or more multifunctional glycidyl ethers. Typical monomers in curable epoxy resins include: glycidyl ethers of dihydric arenes, aliphatic diols or cycloaliphatic diols. Glycidyl ethers of aliphatic diols include linear or branched polymeric epoxides having one or more terminal epoxy groups such as, e.g., diglycidyl ethers of polyoxyalkylene glycols.

Examples of aromatic glycidyl ethers include, but are not limited to, those that can be prepared by reacting a dihydric arene with an excess of epichlorohydrin. Dihydric arenes, as referred to herein, are arenes having two hydrogen atoms available for a reaction with epichlorhydrin. Examples of useful dihydric arenes include resorcinol, catechol, hydroquinone, and polynuclear phenols including p,p'-dihydroxybenzophenone, 2,2'-dihydroxyphenyl sulfone, 2,2-dihydroxy-1,1-dinaphthylmethane, and the 2,2',2,3',2,4',3,3',3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Examples of epoxy resins include those having one or more repeating units derivable from bisphenol A, bisphenol F or both. Other examples of epoxy resins include those that can be prepared by bisphenol A, bisphenol F or both with epichlorohydrin. The epoxy resins may have a molecular weight in the range of from about 170 to about 10,000, preferably from about 200 to about 3,000 g/mol. The average epoxy functionality in the resin is typically greater than 1 and less than 4. Novolak-type resins may also be employed.

Examples of commercially available aromatic and aliphatic epoxides useful in the disclosure include diglycidylether of bisphenol A (e.g. available under the trade designation "EPON 828", "EPON 431", "EPON 1310" and "EPON 1510" from Momentive Specialty ChemicalsGmbH, Duisburg, Germany, and "DER-331", "DER-332", and "DER-334" available from Dow Chemical Co,); diglycidyl ether of bisphenol F (e.g. EPICLON 830) available from Dainippon Ink and Chemicals, Inc.); and flame retardant epoxy resins (e.g. "DER 580", a brominated bisphenol type epoxy resin available from Dow Chemical Co.).

In certain embodiments, when the curable resin comprises a curable epoxy resin, the curing agents are chosen from amine-based compounds, cyanamide-based compounds, mercapto-based compounds, and anhydride-based compounds. In some embodiments, the curing agents are chosen from trioxatridecane diamine, dicyandiamide curing agent, and anhydride curing agent METH/E.

Curing agents suitable for curing, for example, epoxy resins include primary or secondary linear or branched long-chain amines (amine-based curing agents). Examples of suitable curing agent include amine-based curing agents and including those according to the general formula

$$R^1R^2N\text{---}R^3\text{---}NR^4H \qquad (I)$$

wherein $R^1$, $R^2$ and $R^4$ represent, independently from each other, hydrogen, a linear or branched alkyl or a linear or branched polyoxyalkyl moiety. The residues $R^1$, $R^2$, $R^4$ may contain a hydrocarbon containing about 1 to 25 carbon atoms or a poly ether containing from 3 to 25 carbon atoms. Preferably, one, more preferably two and most preferably all residues $R^1$, $R^2$ and $R^4$ are hydrogen. $R^3$ represents a linear or branched alkyl, alkylamine, polyaminoalkyl, polyamidoalkyl, alkylether or polyoxyalkyl residue having at least 5 carbon atoms. Preferably, $R^3$ is a polyether and the curing agent is a polyetheramine or polyetherdiamine including those polyetheramines that can be derived from polypropyleneoxide or polyethylenoxide. $R^3$ may also be a polyamidoamine or a polyamidodiamine including those that can be derived by reacting a dimer or trimer carboxylic acid with a polyetheramine. Examples of polyetheramines that can be used include but are not limited to those corresponding to the general formula

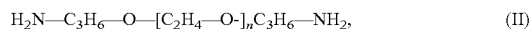

$$H_2N\text{---}C_3H_6\text{---}O\text{---}[C_2H_4\text{---}O\text{-}]_nC_3H_6\text{---}NH_2, \qquad (II)$$

$$H_2N\text{---}C_3H_6\text{---}O\text{---}[C_3H_6\text{---}O\text{-}]_nC_3H_6\text{---}NH_2 \qquad (III),$$

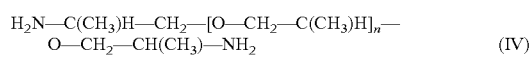

$$H_2N\text{---}C(CH_3)H\text{---}CH_2\text{---}[O\text{---}CH_2\text{---}C(CH_3)H]_n\text{---}$$
$$O\text{---}CH_2\text{---}CH(CH_3)\text{---}NH_2 \qquad (IV)$$

with n being within the range of 1 and 34, such as for example 1, 2, 3, 4, 5, or between 1 and 2 (such as for example 1.5 or 1.7), between 2 and 3 (such as for example 2.5 or 2.7), between 3 and 4 (e.g. 3.5 or 3.7), between 4 and 5 (e.g. 4.5 or 4.7), or n being 31, 32, 33 or between 31 and 33.

Suitable amines are available under the trade designation "PC AMINE DA" from Nitroil, Germany or under the trade designation "JEFFAMINE" from Huntsman, Belgium. A particular preferred curing agent is 4,7,10-trioxatridecane-1,13-diamine (TTD). TTD is commercially available, for example, from BASF or Nitroil. Combinations of curing agents, for example, a combination of two or more polyetherdiamines are also suitable.

Other curing agents for curing epoxy resins include anhydrides and amides, such as cyanamides.

In another embodiment the colorants according to the present disclosure are reactive to a curing reaction involving a curable epoxy resin and a radical curing agent.

In another embodiment the colorants according to the present disclosure are reactive to a curing reaction involving a curable epoxy resin and an amine-based curing agent.

In yet another embodiment the colorants according to the present disclosure are reactive to a curing reaction involving a curable epoxy resin and an amido-based curing agent, for example a cyanamide-based curing agent.

Composites and Methods of Making Composites

The present disclosure is also directed to articles comprising an adhesive composition as described above. In some embodiments, such articles may be composites comprising any of the resins described above in a cured or partially cured form. In certain embodiments, the articles are chosen from rotor blades for wind turbines, watercrafts, aircrafts, motor vehicles, and pieces of furniture.

Typically, composites are made by infusing a mixture of a curable resin and a curing composition on a substrate (such as, for example, reinforcing fibers). The curing time for this process is chosen to be sufficiently long so that the mixture can still be handled and infused while the curing reaction is taking place. In certain embodiments, the reinforcing fibers have been temporarily held in place by a suitable adhesive, such as a sprayable adhesive. Reinforcing fibers may be organic or inorganic. Typically, reinforcing fibers include inorganic fibers, including, but not limited to, glass fibers, ceramic fibers, carbon fibers and combinations thereof. Reinforcing fibers may also include organic fibers such as polyamide fibers including aromatic polyamide fibers like but not limited to (para) aramide fibers (also known as Kevlar fibers).

Embedding the fibers into the resin matrix to create composite articles may be carried out by contacting a mixture of the curable resins and the curing compositions with the reinforcing material and allowing the material to cure.

One commonly used process for making composite materials is the so-called infusion process. The resin infusion process comprises the positioning of reinforcing fibers into a mold cavity. The fibers or an arrangement of fibers may be held in position by the use of adhesives, for example the adhesive compositions of the present disclosure. The mixture of curable resins and curing compositions are allowed to flow into the mold. The resins preferably have a viscosity that allows them to flow into the mold and to embed the reinforcing materials. Typically, vacuum lines are positioned around the mold and are connected to a vacuum pot, which provides the negative pressure that draws the curable resin out of the resin containers into the reinforcement material. When the resin feeds and vacuum lines are installed a bag is placed over the mold. The bag seals the perimeter of the mold and the resin feed and vacuum tubes. A vacuum is then created which sucks the air out of the mold. From the containers the mixture of curable resin and curing compositions is then pulled by the feed lines into the mold to contact or flow around the reinforcement material. The material is then allowed to cure to create a layer of composite material. Curing may be accelerated by heating the fibers impregnated with the resin and curing agents. For the curing the vacuum may be released. The process may be repeated to create multiple layers. During curing, the resin the adhesive compositions according to the present disclosure changes color from an initial to a final color. In certain embodiments, the final color is colorless and the colorant (or adhesive composition) is no longer visible in the cured resin or composite material.

Complete filling of resin in the fiber glass commonly known as "wetting of the fibers" in the industry—is a desired outcome when infusing the resin in order to have a final composite with suitable properties. If there are void spots or improper wetting of the fibers then the composite would be expected to have subpar properties. The present disclosure, by providing a change in the color associated with the fibers upon contact of the resin, provides a method to monitor that the part is completely filled with resin (fully wetted) at an early stage so that the necessary corrective action can be taken.

In other embodiments, a similar infusion process may be used except that instead of vacuum driving the mixture of curable resin and curing composition onto the fibers, positive pressure is being used to pump the mixture.

Methods within the scope of this disclosure include process of preparing a composite material comprising:
  applying an adhesive composition comprising a dye and having an initial color to a substrate;
  contacting the substrate and the adhesive composition with a mixture of a curable resin and a curing composition;
  wherein the curing composition comprises one or more curing agents to provide a composite material; and wherein the initial color of the adhesive composition changes to a final color when the adhesive composition contacts the mixture of the curable resin and the curing composition.

In other embodiments, the adhesive composition used in the process comprises at least 10% by weight (based on the total weight of the composition) of at least one organic solvent.

In certain embodiments, the substrate used in the process is a reinforcing material, and in other embodiments, the reinforcing material comprises glass fibers, ceramic fibers, carbon fibers, and combinations thereof.

In some embodiments, the adhesive composition used in the process contains at least 10% by weight (based on the total weight of the composition) of an organic solvent selected from hydrocarbon liquids, hydrocarbon liquids that further contain functional units selected from ketone units, ether units, carboxylate ester units and combinations thereof. In other embodiments, the adhesive composition used in the process is a spray adhesive and contains one or more propellants selected from liquefied hydrocarbons and compressed gases. Thus, in certain embodiments, the step of applying the adhesive composition to the substrate is carried out by spraying the adhesive composition onto the substrate.

As mentioned before, in other embodiments, the curable resin used in the process comprises a curable epoxy resin, the dye is chosen from triarylmethane compounds, and the curing composition comprises one or more curing agents suitable to cure the curable epoxy resin. In certain embodiments, where the curable resin used in the process is an epoxy resin, the one or more curing agents are chosen from amine-based compounds, cyanamide-based, mercapto-based compounds, and anhydride-based compounds. In other embodiments, where the curable resin used in the process is an epoxy resin, the one or more curing agents are chosen from trioxatridecane diamine, dicyandiamide curing agent, and anhydride curing agent METH/E.

In yet other embodiments, where the curable resin used in the process is an epoxy resin, the dye used in the process is chosen from Brilliant Green, Malachit Green, Crystal Violet, Phenolphthalein, and mixtures thereof. In other embodiments, where the curable resin used is an epoxy resin, the curable epoxy resin used in the process is chosen from a 2K epoxy resin and a 1K epoxy resin.

In some embodiments, when the curable resin used in the process comprises a curable polyester resin, the dye is chosen from phenothiazine compounds, and the curing composition comprises one or more curing agents suitable to cure the curable polyester resin. In some embodiments, the one or more curing agents used in the process are chosen from radical generating curing agents. In other embodiments, the one or more curing agents used in the process are chosen from peroxide-based compounds, such as, for example dibenzoyl peroxide.

In some embodiments, when the curable resin used in the process comprises a curable polyester resin, the dye is methylene blue, new methylene blue, methylene green, azure a, tolonium chloride, and mixtures thereof. In other embodiments, when the curable resin used in the process comprises a curable polyester resin, the curable polyester resin is PLUS 720.

The present disclosure is also directed to methods to monitor whether one or more fibers are being wetted by a liquid, the process comprising:
  applying an adhesive composition comprising a dye and having an initial color to one or more fibers;
  contacting the one or more fibers and the adhesive composition with the liquid;
  wherein the liquid comprises one or more curing agents;
  wherein, by monitoring the change of color of the adhesive composition from an initial color to a final color when the adhesive composition contacts the liquid is possible to monitor whether the one or more fibers are being wetted by the liquid.

In certain embodiments, the adhesive used in the process is a pressure-sensitive adhesive.

The composite materials obtained by the process according to the present disclosure may be used as components of aircrafts, motor vehicles, such as cars and trucks or watercrafts. The materials obtained by the process according to the present disclosure may also be used as components of rotor blades in wind turbines and pieces of furniture.

The present disclosure is now further illustrated by way of examples and particular embodiments without intending to limit the disclosure these examples and embodiments.

EXEMPLARY EMBODIMENTS

1. An adhesive composition comprising
  a dye,
  a sprayable adhesive, and
  optionally a curable epoxy resin;
  wherein the dye is chosen from triarylmethane compounds;
  wherein the adhesive composition is sprayable and has an initial color;
  wherein the adhesive composition is capable of changing color to a final color upon contacting a curing composition comprising one or more curing agents;
  wherein the one or more curing agents are suitable to cure the curable epoxy resin; and
  wherein the initial color is different from the final color.
2. An adhesive composition according to embodiment 1, wherein the one or more curing agents are chosen from amine-based compounds, cyanamide-based compounds, mercapto-based compounds, and anhydride-based compounds.
3. An adhesive composition according to any of the preceding embodiments, wherein the one or more curing agents are chosen from trioxatridecane diamine, dicyandiamide curing agent, and anhydride curing agent METH/E.
4. An adhesive composition according to any of the preceding embodiments, wherein the dye is chosen from Brilliant Green, Malachit Green, Crystal Violet, Phenolphthalein, and mixtures thereof.
5. An adhesive composition according to any of the preceding embodiments, wherein the adhesive composition comprises one or more propellants selected from liquefied hydrocarbons and compressed gases.
6. An adhesive composition according to any of the preceding embodiments, wherein the adhesive is a pressure-sensitive adhesive.
7. An adhesive composition according to any of the preceding embodiments, comprising at least 10% by weight of an organic solvent.
8. An article comprising the adhesive composition according to any of the preceding embodiments.
9. An article comprising the adhesive composition according to any of the preceding embodiments, wherein the article is selected from rotor blades for wind turbines, watercrafts, aircrafts, motor vehicles, and pieces of furniture.
10. A three component composition comprising:
  Component A comprising an adhesive composition according to any of the preceding embodiments and optionally at least 10% by weight of a propellant;
  Component B comprising a curable epoxy composition; and
  Component C comprising one or more curing agents chosen from amine-based compounds, cyanamide-based compounds, mercapto-based compounds, and anhydride-based compounds.
11. A two component composition comprising:
  Component A comprising an adhesive composition according to any of the preceding embodiments and optionally at least 10% by weight of a propellant;
  Component B comprising a curable epoxy composition and one or more curing agents chosen from amine-based compounds, cyanamide-based compounds, mercapto-based compounds, and anhydride-based compounds.
12. An adhesive composition comprising
  a dye,
  a sprayable adhesive, and
  optionally a curable polyester resin;
  wherein the dye is chosen from phenothiazine compounds;
  wherein the adhesive composition is sprayable and has an initial color;
  wherein the adhesive composition is capable of changing color to a final color upon contacting a curing composition comprising one or more curing agents;
  wherein the one or more curing agents are suitable to cure the curable polyester resin;
  wherein the initial color is different from the final color.
13. An adhesive composition according to embodiment 12, wherein the one or more curing agents are chosen from radical generating compounds.
14. An adhesive composition according to any of the preceding embodiments optionally comprising a curable polyester resin, wherein the one or more curing agents are chosen from peroxide-based compounds.
15. An adhesive composition according to any of the preceding embodiments optionally comprising a curable polyester resin, wherein the one or more curing agents is dibenzoyl peroxide. 16. An adhesive composition according to any of the preceding embodiments optionally comprising a curable polyester resin, wherein the dye is chosen from methylene blue, new methylene blue, methylene green, azure A, tolonium chloride, and mixtures thereof.
17. An adhesive composition according to any of the preceding embodiments optionally comprising a curable polyester resin, wherein the adhesive composition comprises one or more propellants selected from liquefied hydrocarbons and compressed gases.
18. An adhesive composition according to any of the preceding embodiments optionally comprising a curable polyester resin, wherein the adhesive is a pressure-sensitive adhesive.
19. An adhesive composition according to any of the preceding embodiments optionally comprising a curable polyester resin, comprising at least 10% by weight of an organic solvent.
20. An article comprising the adhesive composition according to any of the preceding embodiments optionally comprising a curable polyester resin.
21. An article comprising the adhesive composition according to any of the preceding embodiments optionally comprising a curable polyester resin, wherein the article is selected from rotor blades for wind turbines, watercrafts, aircrafts, motor vehicles and pieces of furniture.
22. A three component composition comprising:
Component A comprising an adhesive composition according to any of the preceding embodiments optionally comprising a curable polyester resin and at least 10% by weight of a propellant;
Component B comprising a curable epoxy composition; and
Component C comprising one or more curing agents chosen from peroxide-based compounds.
23. A two component composition comprising:
Component A comprising an adhesive composition according to any of the preceding embodiments optionally comprising a curable polyester resin and at least 10% by weight of a propellant;
Component B comprising a curable epoxy composition and one or more curing agents chosen from peroxide-based compounds.
24. A process of preparing a composite material comprising:
applying an adhesive composition comprising a dye and having an initial color to a substrate;
contacting the substrate and the adhesive composition with a mixture of a curable resin and a curing composition;
wherein the curing composition comprises one or more curing agents to provide a composite material;
wherein the initial color of the adhesive composition changes to a final color when the adhesive composition contacts the mixture of the curable resin and the curing composition.
25. The process according to any of the preceding embodiments directed to processes, wherein the adhesive composition comprises at least 10% by weight (based on the total weight of the composition) of at least one organic solvent.
26. The process according to any of the preceding embodiments directed to processes, wherein the substrate is a reinforcing material.
27. The process according to any of the preceding embodiments directed to processes, wherein the reinforcing material comprises glass fibers, ceramic fibers, carbon fibers, and combinations thereof.
28. The process according to any of the preceding embodiments directed to processes, wherein the adhesive composition contains at least 10% by weight (based on the total weight of the composition) of an organic solvent selected from hydrocarbon liquids, hydrocarbon liquids that further contain functional units selected from ketone units, ether units, carboxylate ester units and combinations thereof.
29. The process according to any of the preceding embodiments directed to processes, wherein the adhesive composition is a spray adhesive and contains one or more propellants selected from liquefied hydrocarbons and compressed gases.
30. The process according to any of the preceding embodiments directed to processes, wherein the step of applying the adhesive composition to the substrate is carried out by spraying the adhesive composition onto the substrate.
31. The process according to any of the preceding embodiments directed to processes, wherein the curable resin comprises a curable epoxy resin, wherein the dye is chosen from triarylmethane compounds, and wherein the curing composition comprises one or more curing agents suitable to cure the curable epoxy resin.
32. The process according to embodiment 31, wherein the one or more curing agents are chosen from amine-based compounds, cyanamide-based, mercapto-based compounds, and anhydride-based compounds.
33. The process according to embodiment 31 or embodiment 32, wherein the one or more curing agents are chosen from trioxatridecane diamine, dicyandiamide curing agent, and anhydride curing agent METH/E.
34. The process according to any embodiment from embodiment 31 to embodiment 33, wherein the dye is chosen from Brilliant Green, Malachit Green, Crystal Violet, Phenolphthalein, and mixtures thereof.
35. The process according to any embodiment from embodiment 31 to embodiment 33, wherein the curable epoxy resin is chosen from a 2K epoxy resin and a 1K epoxy resin.
36. The process according to any of the preceding embodiments directed to processes, wherein the curable resin comprises a curable polyester resin, wherein the dye is chosen from phenothiazine compounds, and wherein the curing composition comprises one or more curing agents suitable to cure the curable polyester resin.
37. The process according to embodiment 36, wherein the one or more curing agents are chosen from radical generating curing agents.
38. The process according to embodiment 36 or embodiment 37, wherein the one or more curing agents are chosen from peroxide-based compounds.
39. The process according to any embodiment from embodiment 36 to embodiment 38, wherein the one or more curing agents is dibenzoyl peroxide.
40. The process according to any embodiment from embodiment 36 to embodiment 39, wherein the dye is methylene blue, new methylene blue, methylene green, azure a, tolonium chloride, and mixtures thereof.
41. The process according to any embodiment from embodiment 36 to embodiment 40, wherein the curable polyester resin is PLUS 720.
42. The process according to any of the preceding embodiments directed to processes, wherein the adhesive is a pressure-sensitive adhesive.
43. An article comprising a composite material obtained by the process according to any of the preceding embodiments directed to processes.
44. An article comprising a composite material obtained by the process according to any of the preceding embodiments directed to processes, wherein the article is selected from rotor blades for wind turbines, watercrafts, aircrafts, motor vehicles and pieces of furniture.

45. A method to monitor whether one or more fibers are being wetted by a liquid, the process comprising:
applying an adhesive composition comprising a dye and having an initial color to one or more fibers;
contacting the one or more fibers and the adhesive composition with the liquid;
monitoring the change of color of the adhesive composition from an initial color to a final color when the adhesive composition contacts the liquid.

EXAMPLES

These examples are for illustrative purposes only and are not meant to be limiting the scope of the appended claims.
Materials
Brilliant Green dye is available from Sigma-Aldrich, St. Louis, Mo. Low VOC Super 77 spray adhesive is a product of 3M Company, St. Paul, Minn. EPIKOTE resins and curing agents are products of Momentive Specialty Chemicals, Duisburg, Germany. Polyester resin PLUS 720 is available from Novol Sp. Z.o.o., Poland.
Colorimetry Analysis Method
A 0.01 molar solution of Brilliant Green in methylene chloride is poured over a layer of non-woven fibers and the solvent allowed to evaporate. The Brilliant Green dye imparts a green color to the fibers. Subsequently, colorless sprayable adhesive Low VOC Super 77 from 3M Company is sprayed on the layer. The non-woven fibers maintain their green color. In a second step, a mixture of epoxy resin (EPIKOTE 828) with amine curing agent (TTD, trioxatridecane diamine) in the appropriate mixing ratio given by the manufacturer, is prepared and brushed on the fibers already containing the Brilliant Green. The construction is then covered using a 50 μm PET film and is quickly mounted onto the sample holder and the experiment started. During the next few minutes, several spectra are taken using a UV/Vis Spectrometer in reflectance. The wavelength range is 360 nm-780 nm and measurements are taken at 10 nm intervals. Initially, a spectrum is collected roughly every minute for 30 minutes.
After the raw data is collected, ASTM method E308 is used to calculate the color coordinates from each spectra taken and the color difference (Delta E) and Delta H are calculated using ASTM D2244 D65 1964 between the initial spectrum at time zero and the spectrum taken at 48 hours.

Example 1

A solution of Brilliant Green in methylene chloride was poured over a layer of non-woven fibers and the solvent allowed to evaporate. The Brilliant Green dye imparted a green color to the fibers. Subsequently, colorless sprayable adhesive Low VOC Super 77 from 3M Company was sprayed on the layer. The non-woven fibers maintained their green color. The sprayed, colored fibers were kept at room temperature for 2 weeks indicating that the dye was compatible with the spray adhesive and no color change was observed.

Example 2

Three curable epoxy resin systems were applied to the non-woven layer from Example 1 that had been dyed with Brilliant Green and sprayed with the Low VOC Super 77 sprayable adhesive.
In Example 2a) a two part epoxy resin was applied (EPIKOTE 828 with amine curing agent TTD (trioxatridecane diamine)) and subjected to curing at room temperature for 20 hours. The green color disappeared on contact with the resin, and after cure, the non-woven layer was colorless and no green color was visible any more.
In Example 2b) a one part epoxy resin was applied (EPIKOTE 828 with dicyandiamide curing agent) and subjected to curing at 120° C. for 2 hours. The green color disappeared on contact with the resin, and after cure, the non-woven layer was almost completely colorless. Traces of Brilliant Green dye were still visible in some areas at the time of the observation.
In Example 2c) a one part epoxy resin was applied (EPIKOTE 431 with anhydride curing agent METH/E (methyl-endomethylene tetrahydrophthalic anhydride)) and subjected to a curing cycle of 1 hour at 80° C., 4 hours at 150° C., and 2 hours at 180° C. The green color disappeared on contact with the resin, and after cure, the non-woven layer was colorless and no green color was visible any more.

Example 3

A polyester resin (PLUS 720 from Novol Sp. Z.o.o., Poland, with dibenzoyl peroxide as curing agent) was applied to a fiber mat to which a mixture of Methylene Blue dye and Low VOC Super 77 sprayable adhesive had previously been applied and subjected to curing. After curing, the visual appearance of the cured composite was the same as obtained with the same adhesive composition but containing no Methylene Blue dye.

Example 4

Multiple droplets of a mixture of Brilliant Green dye with Low VOC Super 77 spray adhesive was added to an epoxy resin system (EPIKOTE Resin MGS RIMR 135 and EPIKURE Curing Agent MGS® RIMH 134, available from Momentive Specialty Chemicals) in a transparent container at room temperature. Upon contact with the epoxy resin system, the Brilliant Green dye in each droplet became colorless and no green color was visible any more.

Example 5

Glass fiber cloth was sprayed with a mixture of Low VOC Super 77 adhesive and Brilliant Green dye, imparting a green color to the surface of the cloth. This sprayed cloth was placed in a vacuum-assisted epoxy resin infusion system. Epoxy resin (EPIKOTE Resin MGS RIMR 135 and EPIKURE Curing Agent MGS® RIMH 134, available from Momentive Specialty Chemicals) was introduced into the system under reduced pressure (vacuum assisted resin transfer molding). As the epoxy resin contacted the cloth, the green color disappeared. After cure, no green color was visible any more.

Example 6

A mixture of Neutral Red dye and Low VOC Super 77 sprayable adhesive was applied to a fiber mat, turning the fiber mat red. After the solvent had evaporated, the fiber mat was treated with PLUS 720 polyester resin containing dibenzoyl peroxide as catalyst. Upon cure of the resin system, the color of the fiber mat changed from red to orange.

We claim:

1. An adhesive composition comprising
   a dye,
   a sprayable adhesive,
   one or more propellants selected from liquefied hydrocarbons and compressed gases; and
   without a curable epoxy resin;
   wherein the dye is chosen from triarylmethane compounds;
   wherein the adhesive composition is sprayable via the one or more propellants and has an initial color;
   wherein the adhesive composition is capable of changing color to a final color upon contacting a curing composition comprising one or more curing agents.

2. An adhesive composition according to claim 1, wherein the one or more curing agents are chosen from trioxatridecane diamine, dicyandiamide curing agent, and anhydride curing agent methyl endomethylene tetrahydrophthalic anhydride.

3. An adhesive composition according to claim 1, wherein the dye is chosen from Brilliant Green, Malachit Green, Crystal Violet, Phenolphthalein, and mixtures thereof.

4. An adhesive composition according to claim 1, wherein the dye is chosen from Brilliant Green, Malachit Green, and mixtures thereof.

5. An adhesive composition according to claim 1, wherein the dye is Brilliant Green.

6. An adhesive composition according to claim 1, wherein the adhesive is a pressure-sensitive adhesive.

7. An adhesive composition according to claim 1, comprising at least 10% by weight of an organic solvent.

8. An article comprising the adhesive composition according to claim 1.

9. An article comprising the adhesive composition according to claim 1, wherein the article is selected from rotor blades for wind turbines, watercrafts, aircrafts, motor vehicles, and pieces of furniture.

10. An adhesive composition according to claim 1, wherein the final color is colorless.

11. An adhesive composition comprising
    a dye,
    a sprayable adhesive,
    one or more propellants selected from liquefied hydrocarbons and compressed gases, and
    without a curable epoxy resin;
    wherein the dye is Brilliant Green;
    wherein the adhesive composition is sprayable via the one or more propellants and has an initial color;
    wherein the adhesive composition is capable of changing color to a final color upon contacting a curing composition comprising one or more curing agents;
    wherein the initial color is different from the final color; and
    wherein the one or more curing agents are chosen from trioxatridecane diamine, dicyandiamide curing agent, and anhydride curing agent methyl endomethylene tetrahydrophthalic anhydride.

12. An adhesive composition according to claim 11, comprising at least 10% by weight of an organic solvent.

13. An adhesive composition according to claim 11, wherein the final color is colorless.

* * * * *

UNITED STATES PATENT AND TRADEMARK OFFICE
CERTIFICATE OF CORRECTION

PATENT NO. : 10,590,312 B2
APPLICATION NO. : 15/527524
DATED : March 17, 2020
INVENTOR(S) : Adrian Jung et al.

Page 1 of 3

It is certified that error appears in the above-identified patent and that said Letters Patent is hereby corrected as shown below:

In the Specification

Column 8,
Line 2, delete "Brillant" and insert -- Brilliant -- therefor.

Column 9,

Lines 16-30, delete " 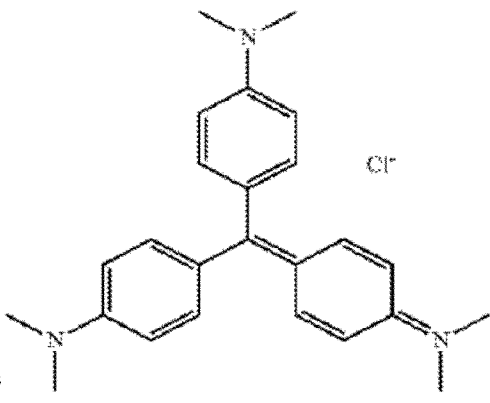 ." and insert in place thereof

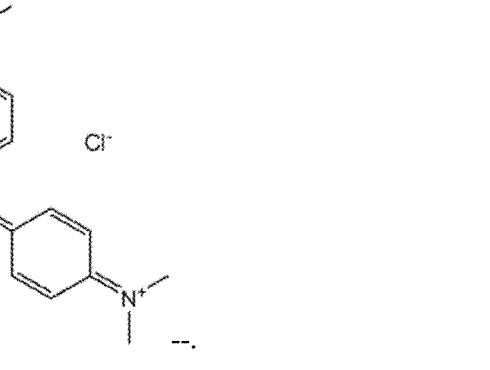 --.

Signed and Sealed this
Twenty-seventh Day of October, 2020

Andrei Iancu
*Director of the United States Patent and Trademark Office*

CERTIFICATE OF CORRECTION (continued)
U.S. Pat. No. 10,590,312 B2

Lines 39-51, delete " 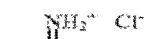 " and insert in place thereof

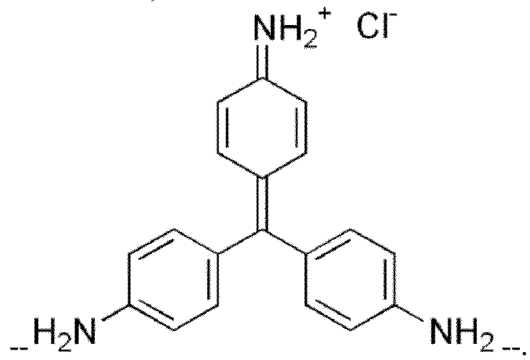

.

Column 11,
Line 24, delete "Malachit" and insert in place thereof -- Malachite --.
Line 45, delete "polyurethans" and insert in place thereof -- polyurethanes --.

Column 12,
Line 5, delete "mercaptobutylate);" and insert in place thereof -- mercaptobutyrate); --.
Line 12, delete "(trimethylopropane" and insert in place thereof -- (trimethylolpropane --.

Column 13,
Line 39, delete "epichlorhydrin." and insert in place thereof -- epichlorohydrin. --.
Line 48, delete "dihydroxydiphenylpropylenphenylmethane" and insert in place thereof -- dihydroxydiphenylpropylenephenylmethane --.

Column 14,
Line 33, delete "polyethylenoxide." and insert in place thereof -- polyethyleneoxide. --.

Column 15,
Line 26, delete "aramide" and insert in place thereof -- aramid --.

Column 16,
Line 58, delete "Malachit" and insert in place thereof -- Malachite --.

Column 17,
Line 66, delete "Malachit" and insert in place thereof -- Malachite --.

Column 20,
Line 29, delete "Malachit" and insert in place thereof -- Malachite --.
Line 32, delete "33," and insert in place thereof -- 34 --.

In the Claims

Column 23,
Line 21, delete "Malachit" and insert in place thereof -- Malachite --.
Line 24, delete "Malachit" and insert in place thereof -- Malachite --.